United States Patent
Thakur et al.

(10) Patent No.: US 12,084,077 B2
(45) Date of Patent: Sep. 10, 2024

(54) SYSTEM AND METHOD OF CURB MANAGEMENT FOR A VEHICLE

(71) Applicant: Nissan North America, Inc., Franklin, TN (US)

(72) Inventors: Siddharth Thakur, Santa Clara, CA (US); Viju James, Fremont, CA (US); Mark Fischer, Santa Rosa, CA (US); Simon Tien, Santa Clara, CA (US); Armelle Guerin, Woodside, CA (US)

(73) Assignee: Nissan North America, Inc., Franklin, TN (US)

( * ) Notice: Subject to any disclaimer, the term of this patent is extended or adjusted under 35 U.S.C. 154(b) by 419 days.

(21) Appl. No.: 17/306,543

(22) Filed: May 3, 2021

(65) Prior Publication Data
US 2022/0348218 A1 Nov. 3, 2022

(51) Int. Cl.
*B60W 50/14* (2020.01)
*G06F 18/214* (2023.01)
*H04W 4/029* (2018.01)
*H04W 4/46* (2018.01)

(52) U.S. Cl.
CPC ........... *B60W 50/14* (2013.01); *G06F 18/214* (2023.01); *H04W 4/029* (2018.02); *H04W 4/46* (2018.02); *B60W 2050/146* (2013.01); *B60W 2420/403* (2013.01); *B60W 2552/53* (2020.02)

(58) Field of Classification Search
None
See application file for complete search history.

(56) References Cited

U.S. PATENT DOCUMENTS

| | | | | |
|---|---|---|---|---|
| 9,747,791 B2* | 8/2017 | Mayer | | G08G 1/0141 |
| 10,288,733 B2* | 5/2019 | Cunha | | G06V 20/586 |
| 10,628,687 B1* | 4/2020 | Krekel | | G06V 20/586 |
| 10,732,622 B2* | 8/2020 | Bettger | | G05D 1/0016 |
| 10,762,782 B2* | 9/2020 | Shurkhovetskyy | .... | G08G 1/147 |
| 10,775,781 B2* | 9/2020 | Elangovan | | B62D 1/00 |
| 11,455,840 B2* | 9/2022 | Max | | G08G 1/0141 |

(Continued)

FOREIGN PATENT DOCUMENTS

| | | | | | |
|---|---|---|---|---|---|
| CN | 103991448 A | * | 8/2014 | | B60R 11/02 |
| CN | 103991448 B | * | 4/2017 | | B60R 11/02 |

(Continued)

OTHER PUBLICATIONS

Teslarati. (Mar. 2, 2019). How does tesla "autopark" parallel parking work? Teslarati. https://www.teslarati.com/how-does-tesla-autopark-parallel-parking-work/.*

*Primary Examiner* — Kevin R Steckbauer
(74) *Attorney, Agent, or Firm* — Global IP Counselors, LLP

(57) ABSTRACT

A curb management system for a host vehicle includes a sensor, an electronic controller, and a wireless communication system. The sensor is configured to detect information relating to a presence of a parked vehicle along a curb of a road. The electronic controller is configured to determine curb management information based on the information detected by the sensor. The wireless communication system is configured to transmit the curb management information to a remote server and to receive a predicted curb availability from the remote server.

20 Claims, 10 Drawing Sheets

(56) References Cited

U.S. PATENT DOCUMENTS

| | | | | |
|---|---|---|---|---|
| 2015/0091741 | A1* | 4/2015 | Stefik | G07F 9/001 |
| | | | | 340/932.2 |
| 2016/0321926 | A1* | 11/2016 | Mayer | G08G 1/0129 |
| 2016/0371607 | A1* | 12/2016 | Rosen | G08G 1/141 |
| 2017/0329007 | A1* | 11/2017 | Cunha | G08G 1/143 |
| 2019/0310624 | A1* | 10/2019 | Bettger | G05D 1/0088 |
| 2020/0117925 | A1* | 4/2020 | Krekel | G06V 20/586 |
| 2022/0343763 | A1* | 10/2022 | Ng | G06N 20/00 |
| 2022/0348218 | A1* | 11/2022 | Thakur | G06V 20/586 |
| 2023/0191934 | A1* | 6/2023 | Lee | G05D 1/0246 |
| | | | | 320/109 |
| 2023/0382368 | A1* | 11/2023 | Schur | B60W 60/0027 |

FOREIGN PATENT DOCUMENTS

| | | | | |
|---|---|---|---|---|
| CN | 106781680 A | * | 5/2017 | |
| CN | 109403689 A | * | 3/2019 | |
| CN | 109615925 A | * | 4/2019 | G06K 9/00771 |
| CN | 106781680 B | * | 7/2019 | |
| CN | 111047900 A | * | 4/2020 | B60W 30/06 |
| CN | 114926820 A | * | 8/2022 | |
| CN | 115050005 A | * | 9/2022 | |
| CN | 115214625 A | * | 10/2022 | G01C 21/3822 |
| DE | 102019127367 A1 | * | 4/2020 | B60W 30/06 |
| DE | 102019125781 A1 | * | 3/2021 | |
| EP | 1643270 A2 | * | 4/2006 | G01S 15/931 |
| EP | 4080164 A1 | * | 10/2022 | G01C 21/3822 |
| FR | 3035734 A1 | * | 11/2016 | G01C 21/3685 |
| JP | 3803021 B2 | * | 8/2006 | |
| JP | 4426014 B2 | * | 3/2010 | B60K 35/00 |
| WO | WO-2005024463 A1 | * | 3/2005 | B60Q 9/006 |

* cited by examiner

SYSTEM AND METHOD OF CURB MANAGEMENT FOR A VEHICLE

BACKGROUND

Field of the Invention

The present invention generally relates to a system and method of curb management for a vehicle. More specifically, the present invention relates to a system and method of obtaining and transmitting curb management information.

Background Information

As the number of vehicles traveling increases, finding curb availability at a destination becomes more difficult. A global positioning system (GPS) can provide a geographical location of a destination, but does not provide information regarding curb availability at the destination.

SUMMARY

A need exists for a system and method of obtaining and transmitting curb management information from a host vehicle. A further need exists for a system and method of transmitting a predicted curb availability to a requesting vehicle.

In view of the state of the known technology, one aspect of the present disclosure is to provide a curb management system for a host vehicle. The curb management system includes a sensor, an electronic controller, and a wireless communication system. The sensor is configured to detect information relating to a presence of a parked vehicle along a curb of a road. The electronic controller is configured to determine curb management information based on the information detected by the sensor. The wireless communication system is configured to transmit the curb management information to a remote server and to receive a predicted curb availability from the remote server.

Another aspect of the present invention is to provide a method of managing curb availability. Information relating to a presence of a parked vehicle along a curb of a road is detected with a sensor of a vehicle. Curb management information is determined based on the information detected by the sensor with a controller of the vehicle. The curb management information is transmitted to a remote server. Map data is updated based on the curb management information. Curb availability is predicted based on the updated map data. The predicted curb availability is transmitted to a requesting vehicle.

Also other objects, features, aspects and advantages of the disclosed system and method of curb management for a vehicle will become apparent to those skilled in the art from the following detailed description, which, taken in conjunction with the annexed drawings, discloses exemplary embodiments of the system and method of curb management for a vehicle.

BRIEF DESCRIPTION OF THE DRAWINGS

Referring now to the attached drawings which form a part of this original disclosure.

DETAILED DESCRIPTION OF EXEMPLARY EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
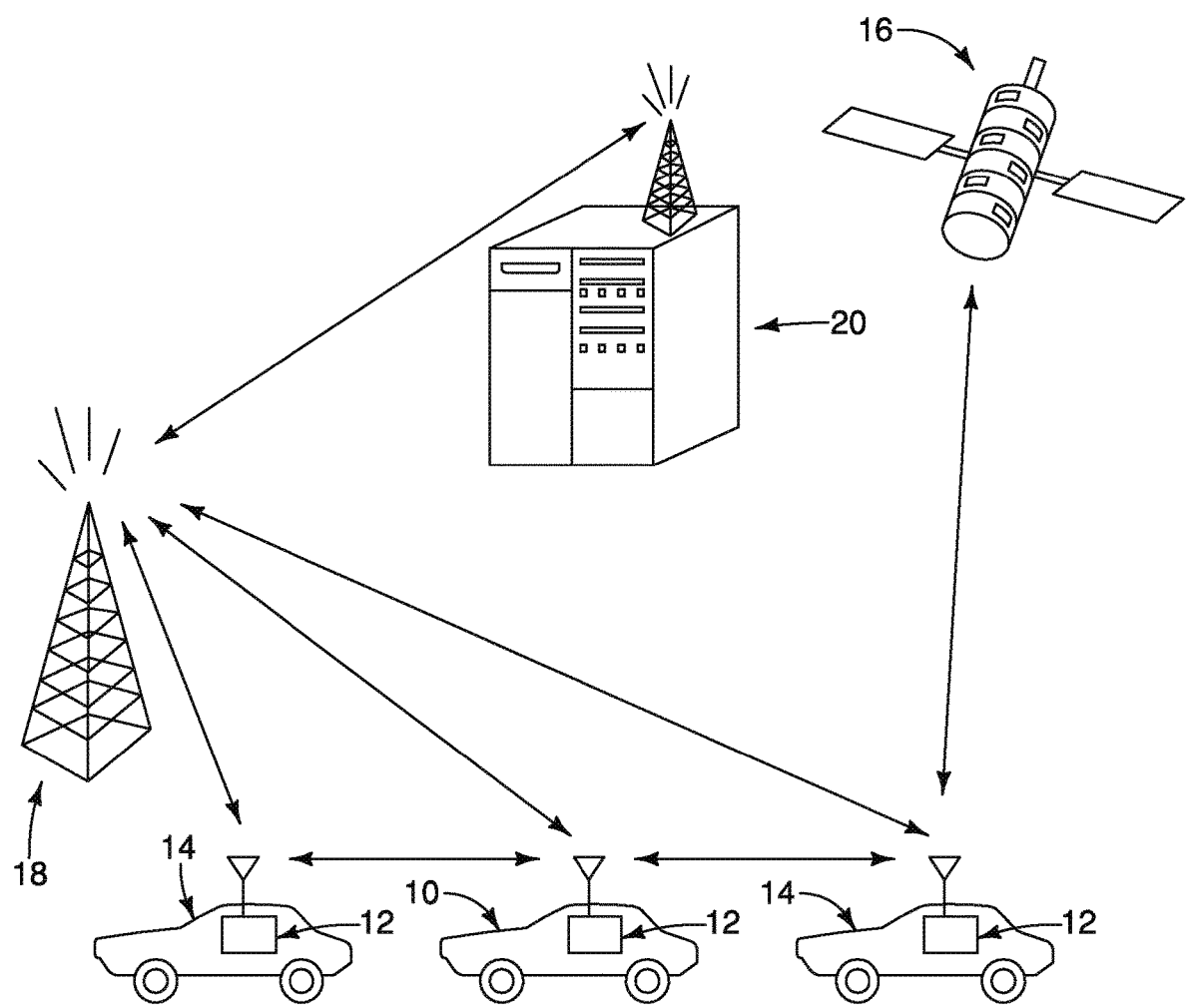
FIG. 1 is a schematic diagram illustrating a host vehicle equipped with a curb management system in accordance with an exemplary embodiment of the present invention.

Referring initially to FIG. 1, a two-way wireless communications network is illustrated that includes vehicle to vehicle communication and vehicle to base station communication. In FIG. 1, a host vehicle 10 (HV) is illustrated that is equipped with a curb management system 12 according to an exemplary embodiment of the present invention, and remote vehicles 14 (RV) that can also include the curb management system 12.

The curb management system 12 of the host vehicle 10 and the remote vehicle 14 communicate with the two-way wireless communications network. As seen in FIG. 1, for example, the two-way wireless communications network can include one or more global positioning satellites 16 (only one shown), and one or more roadside (terrestrial) units 18 (only one shown), and a base station or external server 20. The global positioning satellites 16 and the roadside units 18 send and receive signals to and from the curb management system 12 regarding curb occupancy and availability. The server 20 sends and receives signals to and from the curb management system 12 via a network of the roadside units 18, or any other suitable two-way wireless communications network.

Figure 3:
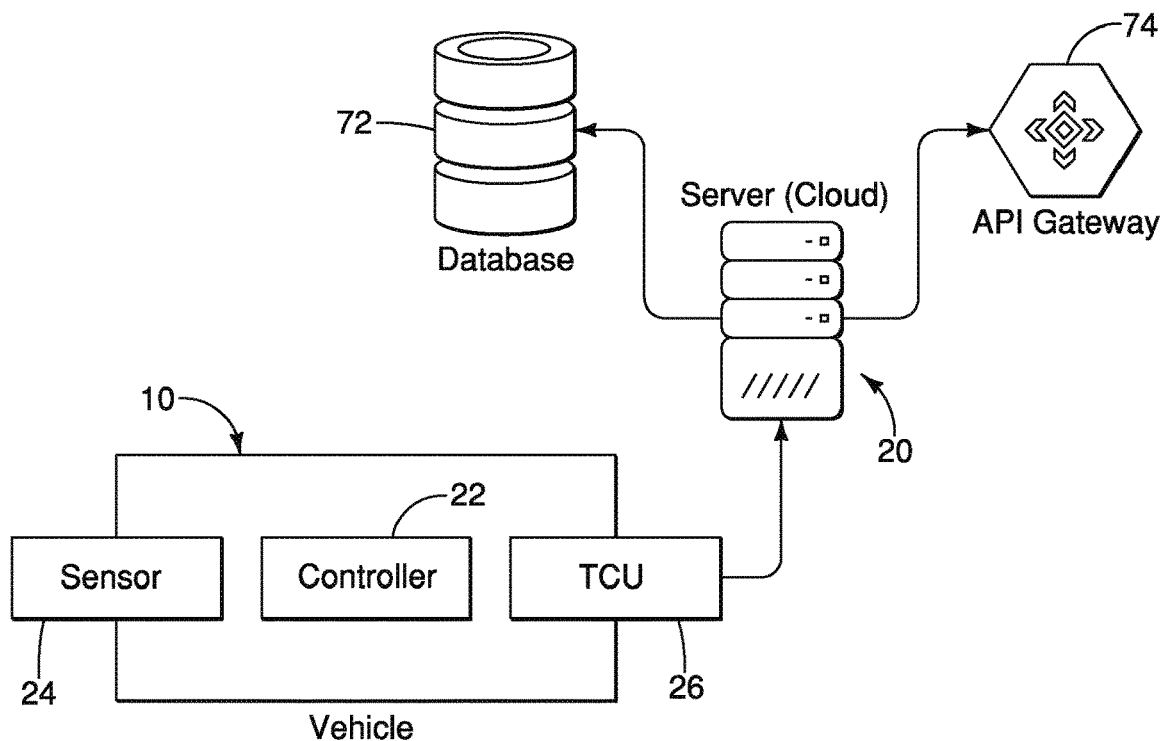
FIG. 3 is a block diagram illustrating components of the curb management system.

The curb management system 12 for the host vehicle 10 includes an electronic controller 22, at least one sensor 24, and a wireless communication system 26. The curb management system 12 further includes the external server 20, a database 72, and an application programming interface (API) gateway 74, as shown in FIG. 3, to facilitate determining a predicted curb availability and transmitting the predicted curb availability to a requesting vehicle.

The electronic controller 22 preferably includes a microcomputer with a control program that controls the components of the curb management system 12 as discussed below. The electronic controller 22 includes other conventional components, such as an input interface circuit, an output interface circuit, and storage device(s), such as a ROM (Read Only Memory) device and a RAM (Random Access Memory) device. The microcomputer of the controller 22 is at least programmed to control the curb management system 12 in accordance with the flowchart of FIGS. 10 and 18 discussed below. The microcomputer of the controller 22 is programmed to control the at least one sensor 24, a display 28, a navigation system 30, and the wireless communication system 32, and to make determinations or decisions, as discussed herein. The memory circuit stores processing results and control programs, such as ones for the at least one sensor 24, the display 28, the navigation system 30, and the wireless communication system 26. The controller 22 is operatively coupled to the at least one sensor 24, the display 28, the navigation system 30, and the wireless communication system 26 in a conventional manner, as well as other electrical systems in the host vehicle 10, such the turn signals, windshield wipers, lights and any other suitable systems. Such a connection enables the controller 22 to monitor and control any of these systems as desired. The internal RAM of the controller 22 stores statuses of operational flags and various control data. The internal ROM of the controller 22 stores the information for various operations. The controller 22 is capable of selectively controlling any of the components of the curb management system 12 in accordance with the control program. It will be apparent to those skilled in the art from this disclosure that the precise structure and algorithms for the controller 22 can be any combination of hardware and software that will carry out the functions of the exemplary embodiments of the present invention. Furthermore, the controller 22 can communicate with the other components of the vehicle communication system discussed herein via, for example a controller area network (CAN) bus or in any other suitable manner as understood in the art.

The controller 22 can include or be in communication with user input devices 32. The user input devices 32 can include, for example, a human-machine interface (HMI), such as a control panel or a touchscreen graphical user interface (GUI), which enables a user (e.g., the driver and/or passenger) to interact with the curb management system 12 as understood in the art and discussed herein. The user input device 32 can be incorporated with the display 28 to facilitate interaction by a user. The controller 22 can further include or be in communication with one or more storage devices 34, such as a vehicle memory, that can store information as described herein.

Figure 2:
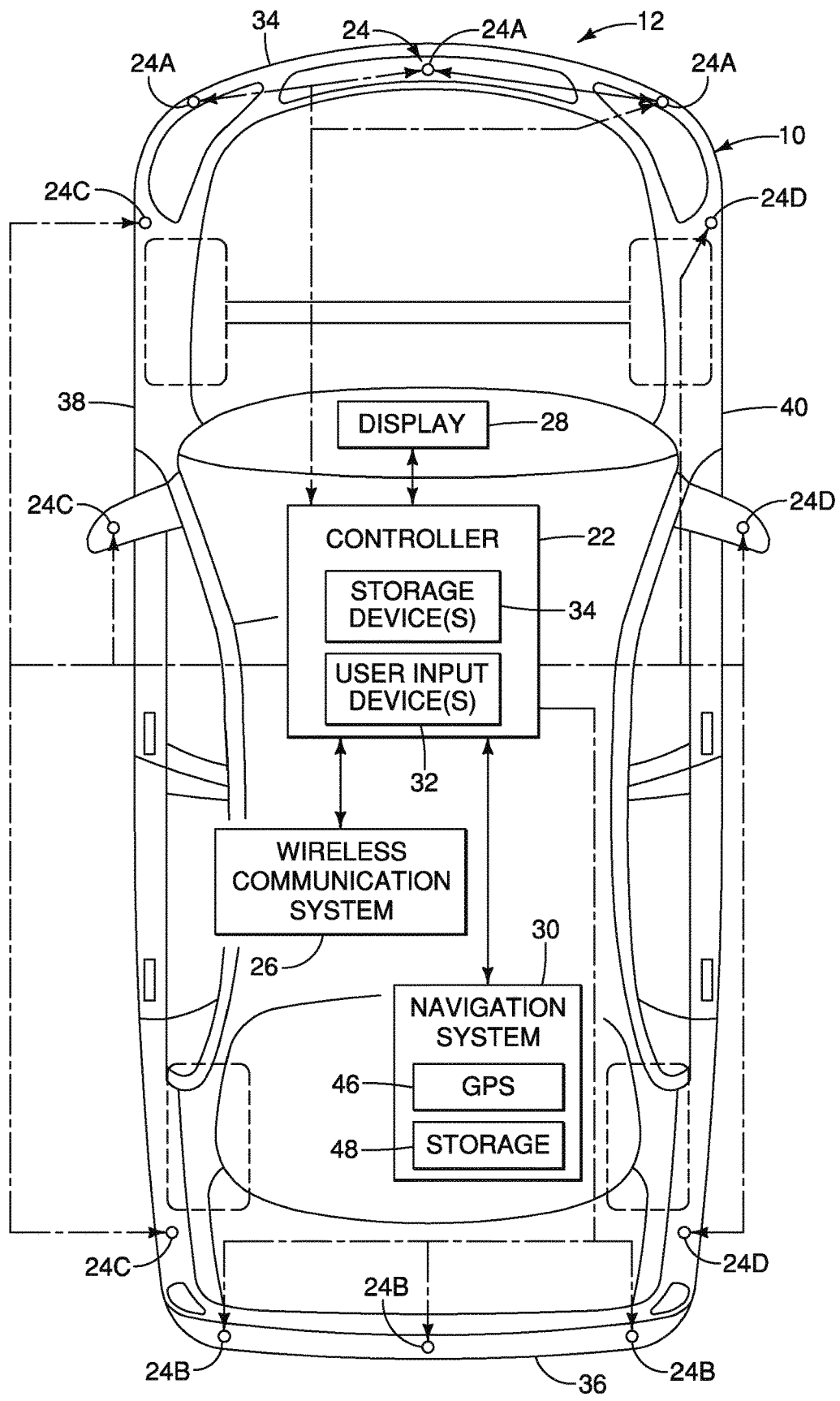
FIG. 2 is a block diagram illustrating components of the curb management system of the host vehicle of FIG. 1.

In addition, the host vehicle 10 is equipped with at least one sensor 24 that can generate or capture vehicle environment information. As shown in FIG. 2, the vehicle 10 is provided with a plurality of sensors 24. Four sensors 24A, 24B, 24C and 24D are provided, although any suitable number of sensors can be used. The plurality of sensors 24 include a front sensor 24A, a rear sensor 24B, a first, or driver's, side sensor 24C and a second, or passenger's, side sensor 24D. The front sensor 24A is preferably centrally located on a front bumper 34 of the vehicle 10. Additional front sensors 24A can be disposed on opposite ends of the front bumper 34. The rear sensor 24B is preferably centrally located on the rear bumper 36. Additional rear sensors 24B can be disposed on opposite ends of the rear bumper 36. The first side sensor 24C and the second side sensor 24D are disposed on the respective sides 38 and 40 of the vehicle 10, such as on an exterior side mirror or proximate a lower surface of the vehicle body structure beneath a door. Additional first and second side sensors 24C and 24D can be spaced along the respective sides 38 and 40 of the vehicle 10. Although the exemplary embodiments of the present invention can be practiced with a single sensor 24, providing a sensor on additional sides of the vehicle 10 allows curb management information to be obtained from any side of the vehicle 10. Additional sensors 24 on each side of the vehicle increase the accuracy and coverage of obtaining curb management information.

The at least one sensor 24 can be any of a plurality of differing types of sensors, often referred to as detection and ranging sensors or devices. The at least one sensor can be, but is not limited to, a depth camera, an ultrasonic sensor, a light detection and ranging (LiDAR) sensor, or a camera. Specifically, the at least one sensor 16 includes an emitting section (not shown) and a detecting section (not shown). The emitting section emits a prescribed signal and the detecting section detects returning signals that are reflected back from surfaces of nearby objects. Detection and ranging sensors are conventional devices, such that further description is omitted for the sake of brevity. The distance between the detected object, such as a parked vehicle 42 or a curb 44 (FIG. 4) and the respective adjacent outer surface of the vehicle 10 is determined by the controller 22 using object information detected by the at least one sensor 24.

At least one sensor 24 is provided such that a distance between an object and the side of the vehicle on which the sensor 24 is disposed can be detected. Preferably, at least one sensor 24 is disposed at each of the sides 38 and 40 of the vehicle 10 to detect a distance between an object and a side of the vehicle 10. As shown in FIG. 2, the vehicle 10 can be provided with at least one sensor 24 on each of the four sides of the host vehicle 10 such that a distance between the vehicle and an object can be detected with respect to any side of the vehicle 24. The front sensor 24A, the rear sensor 24B, the first side sensor 24C, and the second side sensor 24D are sensors configured to detect the presence of the object and to measure and/or determine the distance between the detected object and the respective adjacent outer surface of the vehicle body structure as the vehicle body structure approaches the detected object. Each of the plurality of sensors 24 is configured to detect the distance between an object and the approaching respective outer surface of the vehicle 10 within a predetermined tolerance of, for example, plus-or-minus one inch (less than three centimeters). However, it should be understood that the tolerances can be greater or can be less, depending upon the size of the vehicle 10 and the specific type of sensor employed.

The display 28 displays, for example, navigation information that indicates the location of the host vehicle 10 with respect to a map, as understood in the art. The display 28 can also display information related to operation of the curb management system 12 as set forth in the flowcharts of FIGS. 10 and 18. The display 28 can incorporate the user input device 32, such as through a touchscreen, thereby allowing a user to interact with the curb management system 12.

The curb management system 12 of the host vehicle 10 can further include the vehicle navigation system 30. The vehicle navigation system 30 includes, for example, a communication device 46, such as a GPS (Global Positioning System) communication device, that communicates with the GPS satellites 16. The communication device 46 can also communicate with one or more terrestrial units 18 and the base station or external server 20 to obtain location information and to communicate and receive curb management information. Furthermore, the vehicle navigation system 30 can include or is in communication with a storage device 48 that can store vehicle information, such as previous vehicle route information, location information, or other vehicle information that the GPS is capable of generating, in addition to map data and other location related data as understood in the art. The vehicle navigation system 30 can receive vehicle data from any suitable source, such as a remote device capable of connecting with the navigation system 30.

The curb management system 12 of the host vehicle 10 can further include the wireless communication system, or telematics control unit (TCU), 26. The wireless communication system 26 is a communication transceiver for performing a wireless communication with an external wireless communication device, as is understood in the art. The wireless communication system 26 can be configured for short-range wireless communication, such as Bluetooth, and/or for communication over a wireless network.

The curb management system 12, in accordance with exemplary embodiments of the present invention, allocates and optimizes curb spaces to maximize mobility and access for a wide variety of curb demands. The curb management system 12 allows dynamic and on-demand allocations, rather than being limited to a static allocation. Vehicles 10 and 14 equipped with the curb management system 12 obtain and transmit real-time curb management information to the server 20 while being operated on a road. The curb management information includes information regarding curb availability and occupancy.

Figure 4:
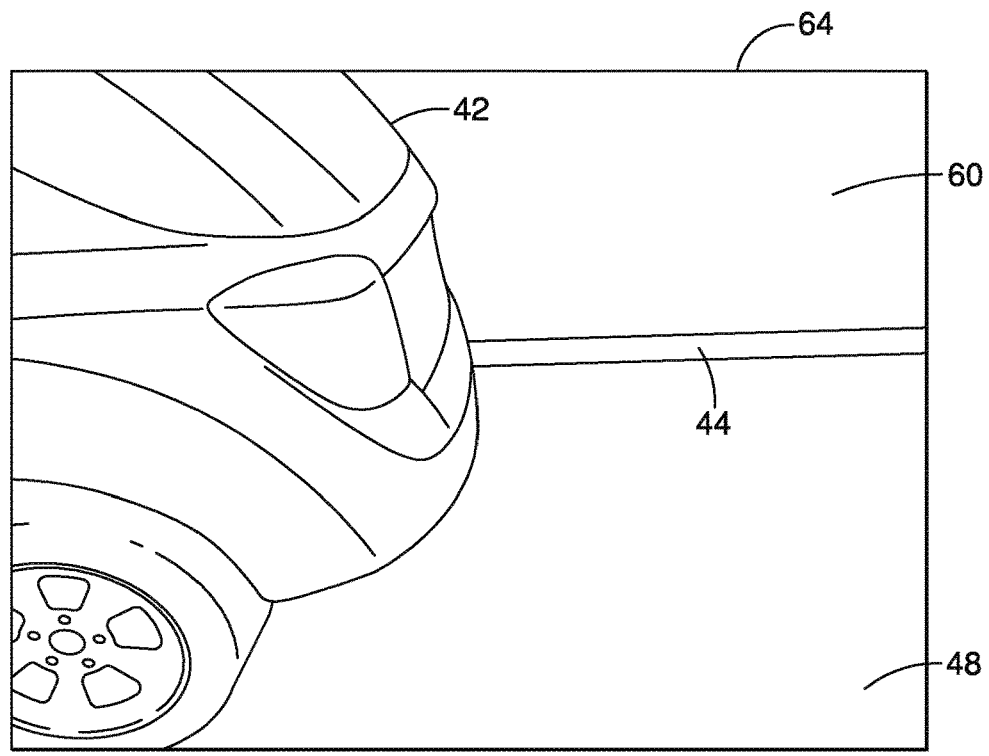
FIG. 4 is an illustration of an image captured by a sensor of a host vehicle of FIG. 1.

The curb management system 12 for the host vehicle 10 includes the sensor 24, the electronic controller 22, and the wireless communication system 26, as shown in FIG. 2. The sensor 24 is configured to detect information relating to a presence of a parked vehicle along the curb 44 of the road 48, as shown in FIG. 4. The electronic controller 22 is configured to determine curb management information, as described below, based on the information detected by the sensor 24. The wireless communication system 26 is configured to transmit the curb management information to the remote server 20 and to receive a predicted curb availability from the remote server 20.

Two dimensions are used for curb management information: localization of the vehicle and perception of free space. Localization is provided by the navigation system 30 and the GPS satellite 16 to provide a position of the vehicle. Localization is provided via the GPS satellite 16 and onboard vehicles systems, such as accelerometers and the navigation system 30, to locate the vehicle 10 in a global reference frame along a road network.

Figure 7:
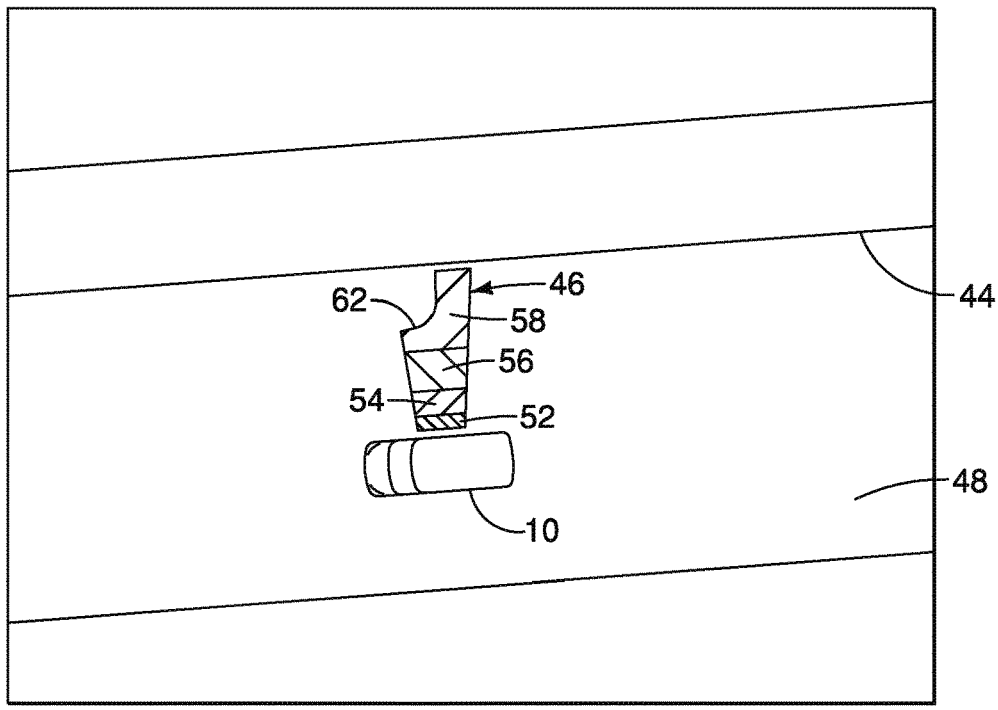
FIG. 7 is an illustration of a visible ground polygon corresponding to the captured image of FIG. 4.
Figure 9:
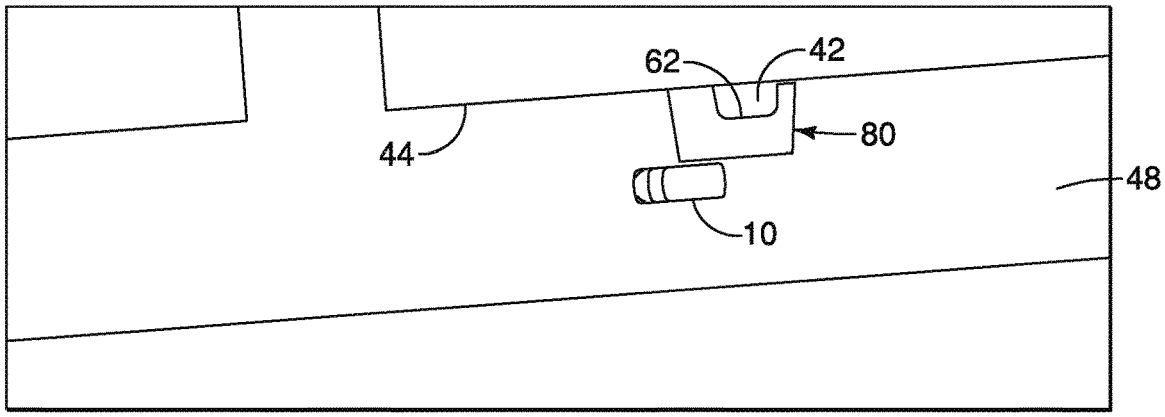
FIG. 9 is an illustration of the visible ground polygon projected to a global reference frame corresponding to the captured images of FIG. 8.

Free space around the vehicle 10 is measured using the at least one sensor 24 on the vehicle 10. The placement and orientation of the sensor 24 is used to classify the sensor reading as ground or not ground segments, as described below. Clustering the ground segments and calculating the boundary of the clustered ground segments provides a measurement of available free space around the vehicle 10. The clustered ground segments form a visible ground polygon 46, as shown in FIG. 7, that represents the area on a ground plane visible from the sensor's view. The visible ground polygon 46 excludes space/area occupied by an obstacle, such as a small obstacle, such as a garbage bin, bicycle, etc., or a large obstacle, such as a car, tree, pole, etc. In other words, the shape of the visible ground polygon 46 indicates a shape of the space not occupied by an object and that is available on the curb 44 (FIG. 9).

Curb availability or occupancy is determined with information relating to the presence of an object along the curb 44 of the road 48 (FIG. 4) with the at least one sensor 24 provided on the vehicle 10. The target output is to calculate the visible ground polygon 46, as shown in FIG. 7. Based on the at least one sensor 24, different processing techniques can be used to calculate the visible ground polygon 46.

Figure 5:
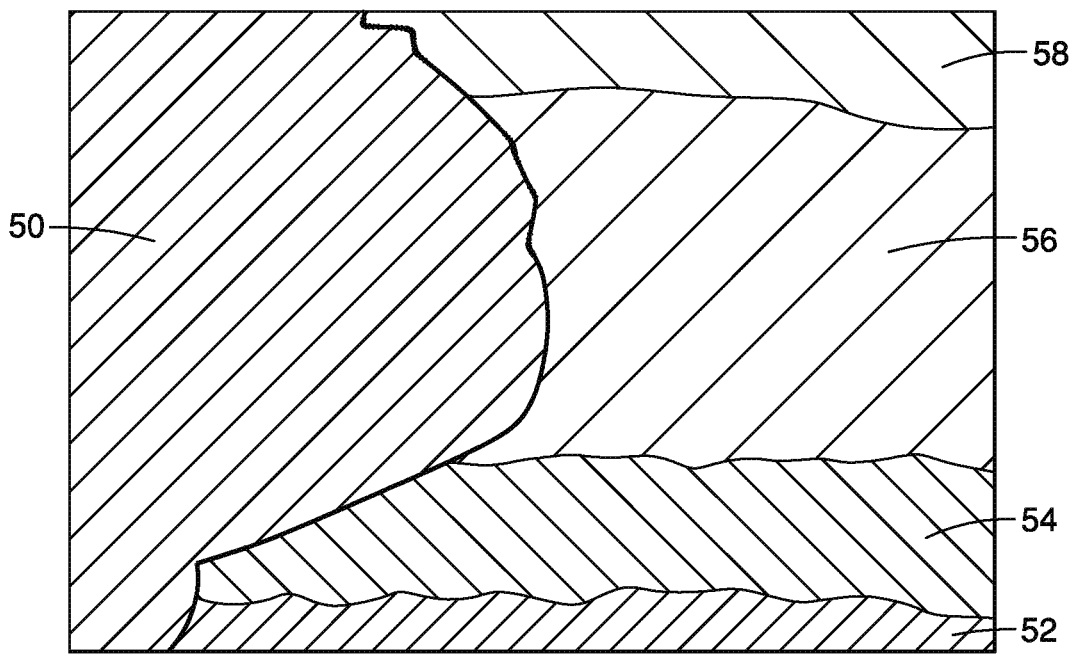
FIG. 5 is a processed depth image corresponding to the captured image of FIG. 4.
Figure 6:
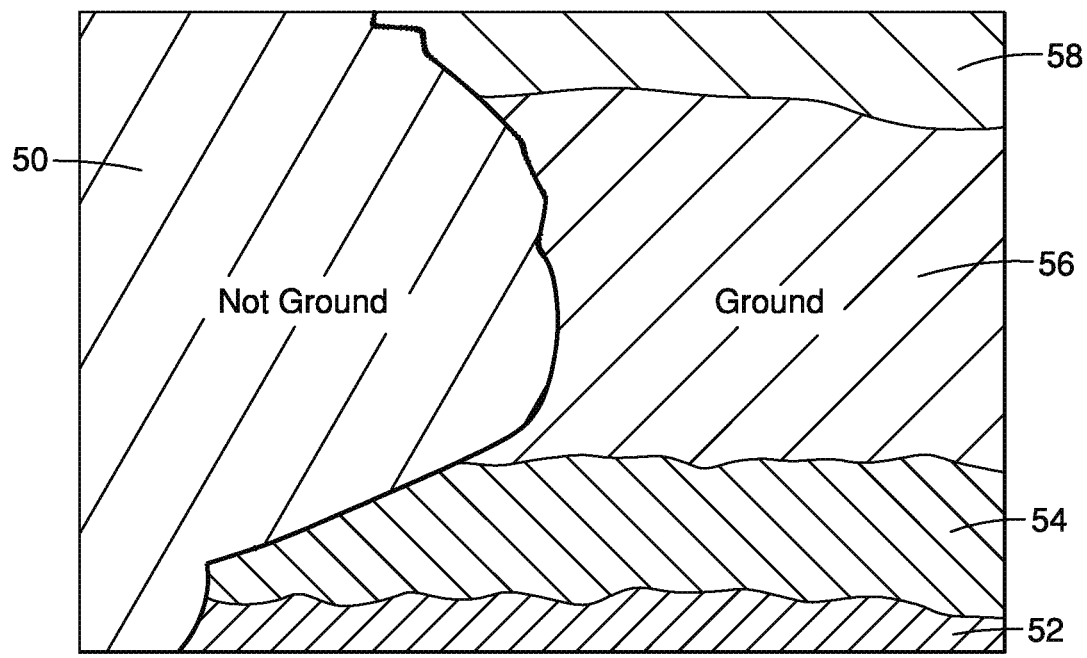
FIG. 6 is a determination of ground or not ground points based on the depth image of FIG. 5.

The at least one sensor 24 can be a conventional depth camera. The depth camera provides a depth frame, or image, as shown in FIG. 5, which represents a distance of each pixel i, j from the depth camera. Using a pinhole camera model, the distance at each pixel i, j is translated into an x, y, z distance in meters from a lens of the depth camera. By utilizing the known parameters of the sensor's placement (i.e., the position and orientation of the depth camera on the vehicle), the depth image is classified into ground and not ground points, as shown in FIG. 6. The ground level points are then clustered and the boundary polygon is extracted to define the visible ground polygon 46, as shown in FIG. 7.

The at least one sensor 24 can be a conventional ultrasonic sensor. The ultrasonic sensor returns the distance to an object, or surface. By utilizing the known parameters of the sensor's placement (i.e., the position and orientation of the ultrasonic sensor on the vehicle 10) and the vehicle's movement, the visible ground polygon 46 (FIG. 7) is constructed. The visible ground polygon 46 represents the free, unobstructed space at the height at which the ultrasonic sensor is disposed. Ultrasonic sensors are often placed at approximately a height of a vehicle bumper, thus providing reliable curb information, although the ultrasonic sensor can be disposed at any suitable position on the vehicle 10.

The at least one sensor 24 can be a conventional LiDAR. The LiDAR sensor emits a laser light and measures the distance from which it is reflected back. Output generated from a LiDAR scan is called a point cloud, and is similar to the output generated by the depth camera. Similar to the depth camera, using the sensor's placement and orientation parameters, the point cloud can be classified as ground and not ground points. Clustering and calculating the boundary off the ground points cluster provides the visible ground polygon 46, as shown in FIG. 7.

The at least one sensor 24 can be a conventional camera. Based on the specification and sensitivity of the camera, depth information can be calculated from the camera output. This depth measurement is used similarly to the measurements obtained with a depth camera to extract the visible ground polygon 46, as shown in FIG. 7. For other cameras that cannot generate depth information, a conventional semantic segmentation process is used to classify the image into ground and not ground pixels. Clustering and calculating the boundary of the ground pixels provide a representation of the visible ground polygon in the pixel domain. The visible ground polygon can be converted from the pixel representation to a cartesian representation based on the pixel representation representing all points on the ground plane.

While the at least one sensor 24 is described as including at least one of a depth camera, an ultrasonic sensor, a LiDar sensor and a camera, the at least one sensor can be any suitable device for determining a distance to an object as described above.

Figure 10:
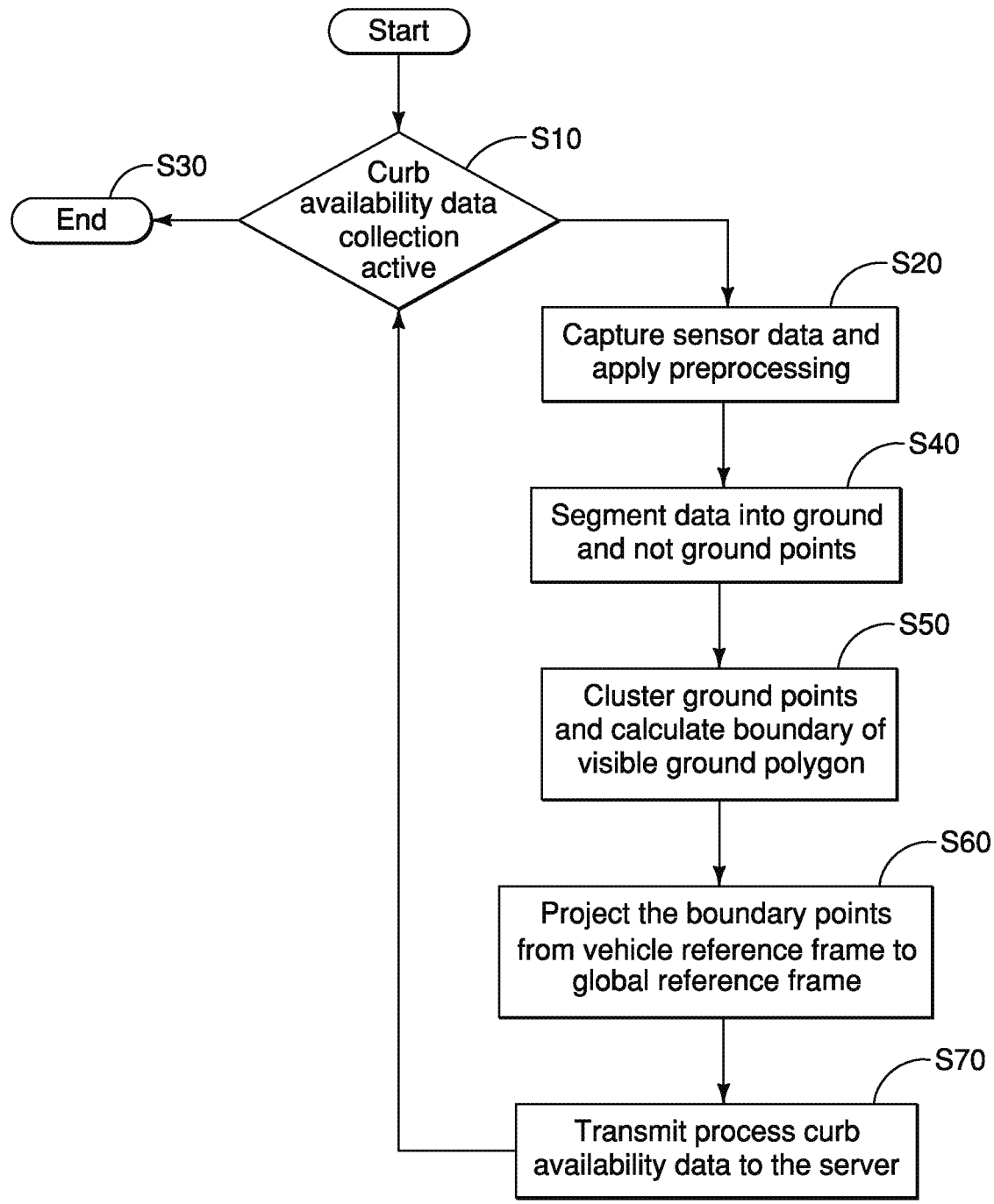
FIG. 10 is a flowchart illustrating a process of obtaining curb availability by the host vehicle of FIG. 1.

As shown in FIG. 10, the process of obtaining curb information begins with collecting curb availability data. In Step S10, when curb availability data collection is active, the process moves to step S20 to capture data with the sensor 24 and to apply preprocessing with the electronic controller 22. When curb availability data collection is not active in step S10, the process moves to step S30 and ends.

Curb availability data collection can be activated by a predetermined action. For example, curb availability data collection can be activated by a geofence, a speed threshold, a road type, being in the right-most lane, or a time of day. Other predetermined actions can also be used to activate curb availability collection, such as manually activating the collection of curb availability data. Curb availability data collection can be activated by one predetermined action or by a combination of predetermined actions. Activating curb availability data collection activates the sensor 24 to detect the information relating to the presence of an object along a curb 44 of the road 48 (FIG. 4). Stopping the curb availability data collection stops the sensor 24.

A geofence is a virtual perimeter for a real-world geographic area. The geofence can by dynamically generated, such as a predetermined radius around a point location, or be a pre-defined set of boundaries. The location of the vehicle 10 is obtained through the navigation system 30, such that when the vehicle 10 is determined to enter a geofence the collection of curb availability data is activated. The geofence can be stored in the storage 48 of the navigation system 30, or can be determined through communication with the server 20. The sensor 24 is activated to collect curb availability data upon the navigation system 30 determining that the host vehicle 10 is entering a predetermined geographical arear, or a geofence. The sensor 24 and the collection of curb availability data are stopped when the vehicle exits the predetermined geographical location.

The collection of curb availability data can be activated when the speed of the vehicle 10 is less than or equal to a predetermined threshold value. When the current speed of the vehicle 10 is less than or equal to the predetermined threshold value, the collection of curb availability data is activated. The sensor 24 is activated to collect curb availability data upon the speed of the host vehicle 10 being less than or equal to a predetermined speed. The sensor 24 and the collection of curb availability data are stopped when the vehicle exceeds the predetermined speed.

The collection of curb availability data can be activated when the vehicle is determined to be on a predetermined road type. When the navigation system 30 of the vehicle 10 determines that the vehicle is currently on a road corresponding to one of the predetermined road types, the collection of curb availability data is activated. The user can select a road type through the input device 32, such that when the host vehicle 10 is determined to be traveling on the selected road type the collection of curb availability is activated. The sensor 24 is activated to collect curb availability data upon the navigation system 30 determining that the host vehicle 10 is traveling on a selected road type selected in the navigation system 30. The sensor 24 and the collection of curb availability data are stopped when the vehicle stops traveling on the selected road type.

The collection of curb availability data can be activated when the vehicle 10 is determined to be in the right-most lane. When the navigation system 30 of the vehicle 10 determines that the vehicle is currently traveling in the right-most lane of the road, the collection of curb availability data is activated. The sensor 24 is activated to collect curb availability data upon the navigation system 30 determining that the host vehicle 10 is in the right-most lane of the road 48 being traveled. The sensor 24 and the collection of curb availability data are stopped when the vehicle exits the right-most lane.

The collection of curb availability data can be activated based on the time of day. When the current time of day is determined to be the predetermined time of day, the collection of curb availability data is activated. The sensor 24 is activated to collect curb availability data based on the time of day. The sensor 24 and the collection of curb availability data are stopped when the predetermined time of day ends.

In step S20 of FIG. 10, sensor data is captured with the at least one sensor 24 and the captured data is pre-processed by the electronic controller 22. As shown in FIG. 4, the vehicle 10 is traveling on the road 48 on which the parked vehicle 42 is parked parallel to the curb 44. The captured sensor data, as shown in FIG. 5, provide a distance to the detected object from the at least one sensor 24. The cross-hatching in FIG. 5 indicates different distances to the detected object. The cross-hatching 50 indicates an object closest to the sensor 24. The cross-hatchings 52, 54, 56 and 58 indicate objects at different distances and that are further from the sensor 24 than the area indicated with the cross-hatching 50. The pre-processing of the data transforms the data into measurements of the captured area.

The process then moves to step S40 of the flowchart of FIG. 10 in which the data is segmented into ground and not ground points, as shown in FIG. 6. Based on the determined distance to a detected object, the points can be classified as either a ground or not ground point. Objects determined to have a shorter distance, such as the detected parked vehicle 42 (FIG. 4), are classified as not ground points in FIG. 6. Objects determined to have a larger distance, such as the curb 44 (FIG. 4), are classified as ground points in FIG. 6. As shown in FIGS. 5 and 6, the cross-hatching 50 corresponds to the parked vehicle 42, which is determined to be a close object and classified as not ground points. The cross-hatching 52, 54, 56 and 58 correspond to the road 48, the curb 44 and the adjacent sidewalk 60 (FIG. 4), which are classified as ground points. The areas corresponding to the cross-hatching 52, 54, 56 and 58 are not detected as having an object in them, such as a parked vehicle, such that these areas are determined to be a free, or available, space on the curb 44.

The process then moves to step S50 of the flowchart of FIG. 10 in which the ground points are clustered and the boundary of the visible ground polygon 46 is calculated, as shown in FIG. 7. The visible ground polygon 46 corresponds to the points classified as ground points. The visible ground polygon 46 includes the points belonging to the areas indicated by cross-hatching 52, 54, 56 and 58 in FIGS. 5 and 6. A cut-out portion 62 in the visible ground polygon 46 corresponds to the not ground points of FIG. 6. The cut-out portion 62 corresponds to a rear end of the parked vehicle 42 in FIG. 4. The visible ground polygon 46 illustrated in FIG. 7 corresponds to the information in the captured image 64 of FIG. 4 captured by the sensor 24.

The process then moves to step S60 in which the boundary points from the vehicle reference frame are projected to a global reference frame, as shown in FIG. 7. The visible ground polygon 46 is projected onto a global reference frame in accordance with the global position of the vehicle 10 obtained through the navigation system 30. The visible ground polygon 46 is mapped onto a map, as shown in FIG. 7, to create curb management information to be transmitted to the server 20 for processing in accordance with the flowchart of FIG. 11.

The process then moves to step S70 in the flowchart of FIG. 10 in which the curb availability data is transmitted to the server 22 by the wireless communication system 26 of the vehicle 10. The process returns to step S10 and repeats while the curb availability data collection is active. The process ends and moves to step S30 when the curb availability data collection is inactivated, such as when the vehicle 10 exits the geofence.

Figure 8:
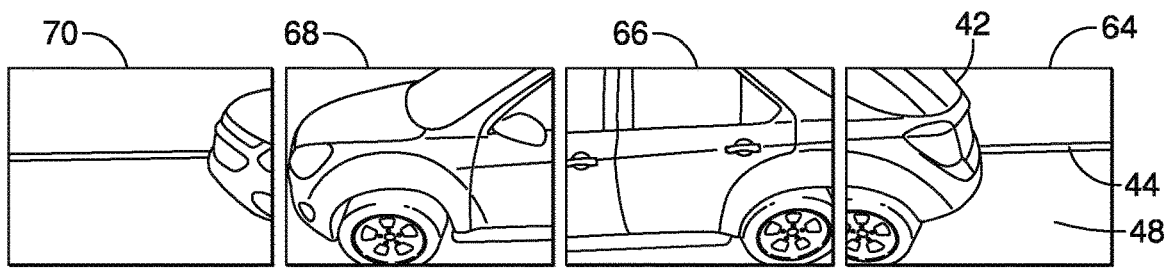
FIG. 8 is a plurality of sequential images captured by the sensor of the host vehicle of FIG. 1.

As the vehicle 10 continues to travel along the road 48, the process returns to step S10 in which a determination is made whether the curb availability data collection is active. When the curb availability data collection is determined to not be active in step S10, the process moves to step S30 and ends. When the curb availability data collection is determined to be active in step S10, the process moves to step S20. The sensor 24 continues to sequentially capture images, as shown in FIG. 8, while the curb availability data collection remains active. A first captured image 64, as shown in FIGS. 4 and 8, captures a rear portion of the parked vehicle 42 parked along the curb 44 and free space behind the parked vehicle 42. A second captured image 66 captures a middle portion of the parked vehicle 42. A third captured image 68 captures a front portion of the parked vehicle 42. A fourth captured image captures the front portion of the parked vehicle 42 and free space in front of the parked vehicle 42. The process repeatedly steps through steps S20, S40, S50 and S60 while the curb availability data collection remains active, and transmits the processed curb management information to the server 22 corresponding to each of the captured images 64, 66, 68 and 70 in step S70. Visible ground polygons 46 corresponding to the information collected in the captured images 66, 68 and 70 are generated similarly to the visible ground polygon 46 of FIG. 7, are similarly projected to the global reference frame to generate curb management information, and the curb management information is transmitted to the remote server 20.

Figure 11:
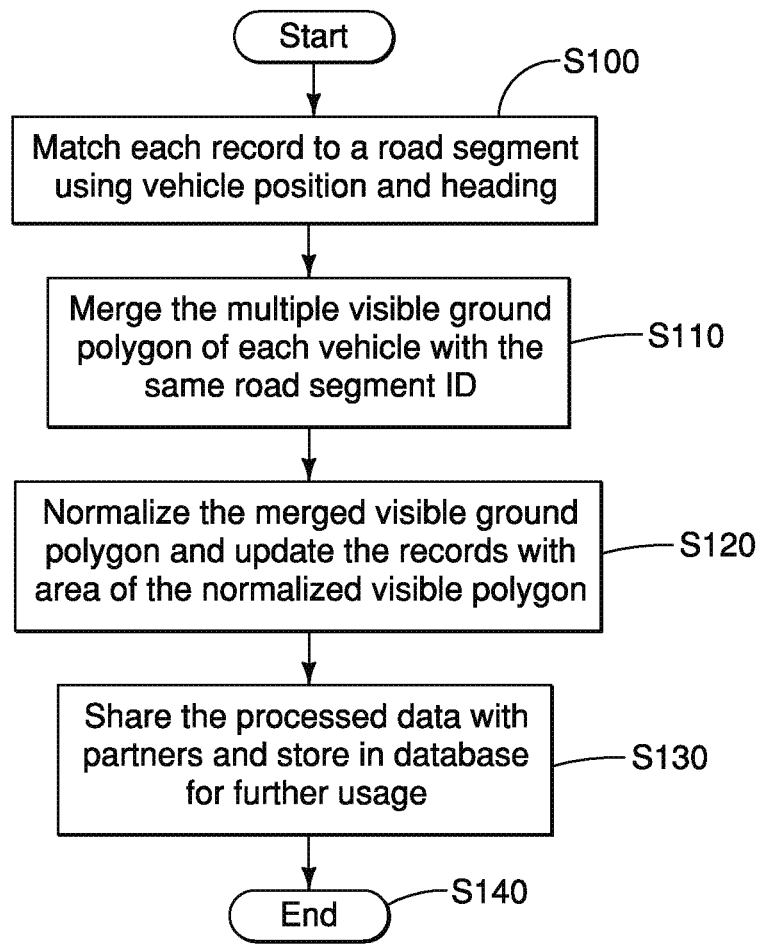
FIG. 11 is a flowchart illustrating a process of predicting curb availability by a remote server of FIG. 1.

The curb management information transmitted by the vehicle 10 is received by the server 22, as shown in FIGS. 1 and 3. The server 22 processes and normalizes the received curb management information received from each vehicle, such as the host vehicle 10 and remote vehicles 14, as shown in the flowchart of FIG. 11. After the received data is processed and normalized, a predicted curb availability can be transmitted to a requesting vehicle.

The processing and normalizing of the received curb management information includes three steps, as shown in steps S100, S110 and S120 of the flowchart of FIG. 11. In step S100, a map matching process is performed in which the received curb management information is matched to a map. In step S110, a merging process is performed in which all the data received from one vehicle is merged. In step S120, a normalization process is performed in which a curb availability measurement is normalized to a standard curb length. The map data is updated in step S120 with the normalized visible ground polygons 80 (FIG. 9) received from each transmitting vehicle 10 and 14.

In step S100 of the flowchart of FIG. 11, each record received by the server 20 (FIG. 3) is matched to a road segment using the position and heading of the vehicle transmitting the curb management information. Each measurement of curb availability received from the transmitting vehicle 10 and 14 contains at least the following attributes: a timestamp, a position, a heading, and a visible ground polygon. The timestamp includes the time at which the curb availability information was collected by the transmitting vehicle. The position includes the latitude and longitude of the vehicle at the time the curb availability was collected. The heading indicates the direction in which the transmitting vehicle was traveling at the time the curb availability information was collected. The visible ground polygon 46 (FIG. 7) is represented as a series of GPS coordinates.

Using the position and heading transmitted by the transmitting vehicle, a conventional map matching algorithm identifies the road segment closest to the recorded position of the transmitting vehicle. Based on the positional accuracy of the GPS coordinates and previous measurements, the vehicle can be located to a specific lane of the identified road segment. The identified road segment and, if available, the specific lane of the transmitting vehicle, is attached to a curb availability data stream.

The process then moves to step S110 of the flowchart of FIG. 11 in which multiple visible ground polygons from the same transmitting vehicle for the same identified road segment are merged. All data from a given transmitting vehicle for a given road segment is merged to create a representation of available curb space as the vehicle drives by the curb 44 (FIG. 4). Unlike individual visible ground polygons, this merged visible ground polygon represents the curb availability across time for the given road segment. This merging step also functions as an aggregation step in the data processing pipeline as curb availability data transferred from the transmitting vehicle to the external server 22 can be asynchronous.

The process then moves to step S120 of the flowchart of FIG. 11 in which the visible ground polygons 46 (FIG. 7) received from the transmitting vehicle are normalized and the records are updated with the normalized visible polygon 80 (FIG. 9). The size of the visible ground polygon 46 varies as the vehicle drives by. There can also be an overlap between consecutive records, as shown by the sequential captured images in FIG. 8, as the vehicle drives along the road segment. Normalizing the curb availability measurement along the road segment into a standard curb length, for example, 0.5 meters, allows the curb availability information transmitted from one vehicle or from a plurality of vehicles 10 and 14 (FIG. 1) to be combined to generate the normalized visible ground polygon 80, as shown in FIG. 9. Using the position and heading of the transmitting vehicle, a subsection of the standard segment from the merged visible ground polygon is extracted. The area of the extracted polygon is used to determine whether the curb is available or occupied. The ratio between a visible area and a total possible area of the extracted polygon is used to classify the standard subsection of the curb as available or occupied.

The normalized curb availability data includes at least the following attributes: a timestamp, a position, a heading, a visible ground polygon, and an identification of the road segment. The normalized curb availability data can also include an identification of the lane, a normalized visible area, and a ratio of the normalized visible area to total possible area for the normalized subsection. The position of the normalized curb availability data includes the latitude and longitude. The visible ground polygon of the normalized curb availability data is represented as a series of GPS coordinates.

The normalized curb availability data is used for digital curb management, such as, but not limited to, available on-street parking prediction, monitoring curb use, and enforcing dynamic curb allocation.

The visible ground polygon 46 shown in FIG. 7 corresponds to the captured image 64 of FIGS. 4 and 8. A visible ground polygon based on the captured images 66, 68 and 70 of FIG. 8 is similarly calculated in accordance with steps S20, S40, S50 and S60 of the flowchart of FIG. 10. The curb management information is transmitted by the transmitting vehicle to the server 20. The server 20 matches the curb management information to a road segment, merges the curb management information for the road segment from the same vehicle, and normalizes the merged visible ground polygons to generate a normalized visible ground polygon 80 for the road segment 48, as shown in FIG. 9. The server 20 updates the map data with the area of the normalized visible ground polygons 80 for the road segment 48 based on the curb management information transmitted by each transmitting vehicle 10 and 14. The remote sever 20 receives curb management information from a plurality of transmitting vehicles 10 and 14, and updates the map data based on the curb management information received from the plurality of transmitting vehicles. As shown in the flowchart of FIG. 12, the server 20 can then predict curb availability based on the updated map data, and transmit the predicted curb availability to a requesting vehicle.

As shown in FIG. 9, the normalized visible ground polygon 80 corresponds to the visible ground polygons 46 of the captured images 64, 66, 68 and 70 that have been merged and normalized. The cut-out portion 62 of the normalized visible ground polygon 80 corresponds to the parked vehicle 42 (FIGS. 4 and 8). The normalized visible ground polygon 80 corresponds to visible ground. In other words, the normalized visible ground polygon 80 indicates ground that is not occupied by an object, such as a vehicle. The ground not occupied by a vehicle corresponds to a portion of the curb 44 available for parking. When the map data is updated with the normalized visible ground polygon 80 in step S120, the map data indicates portions of curbs 44 in which parking is not allowed, such as no parking zones or where a fire hydrant is located. Normalized visible polygons 80 indicating curb availability where parking is not allowed is accounted for by the map data, and such available curb space is disregarded. Areas indicated as being available for parking due to the process of determining curb management information are then indicated as not being available for parking due to the map data indicating that the area is a no parking zone.

The server 20 stores the map data in a database 72, as shown in FIG. 3. The server 20 can aggregate the normalized curb availability such that an accurate prediction can be transmitted to a requesting vehicle regarding the availability of a curb for a specified lane. The application programming interface (API) gateway 74 allows a request from a requesting vehicle to be directed to the appropriate remote server 20 and database 72 to obtain a predicted curb availability for a desired location.

Figure 12:
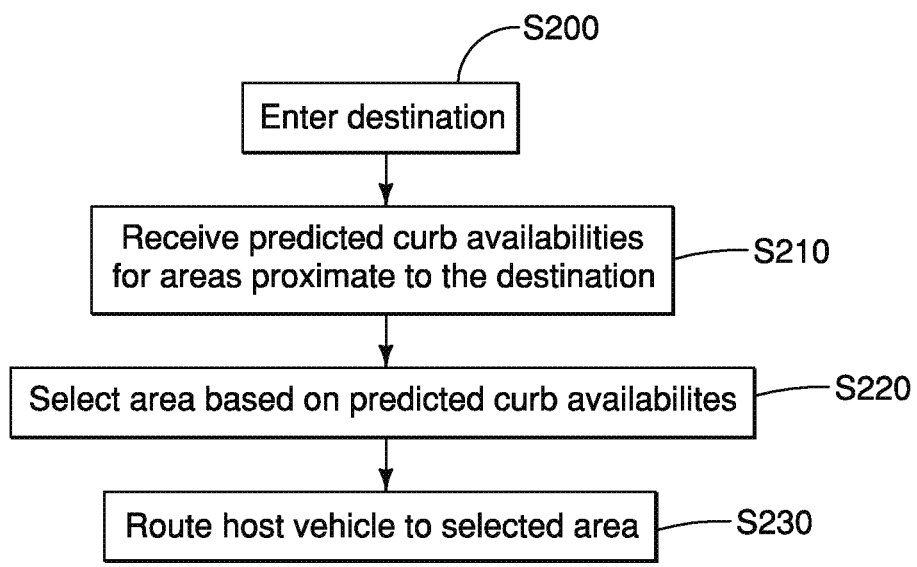
FIG. 12 is a flowchart illustrating a process of transmitting predicted curb availability to a requesting vehicle.

The flowchart of FIG. 12 illustrates the process of obtaining a predicted curb availability by a requesting vehicle 10 (FIGS. 2 and 3). A user in the requesting vehicle 10 enters a desired destination in step S200, such as a store or a restaurant. The requesting vehicle 10 transfers the destination to the remote server 20, which can access the appropriate remote server through the API gateway 74. The API gateway 74 allows the map data to be shared between servers. The server 20 accesses the database 72 and determines a predicted curb availability for areas proximate to the desired destination. The user can select through the user input 32 (FIG. 2) a predetermined distance from the destination for which a predicted curb availability is desired. The predicted curb availability can be for a specific day of the week, or a specific time of the day, or a combination thereof. The remote sever 20 can transmit a plurality of predicted curb availabilities to the requesting vehicle based on the user request, such as when a plurality of curbs on a plurality of different road segments are within a predetermined distance of the destination.

The predicted curb availability is transmitted from the server 20 to the requesting vehicle. The predicted curb availability can be displayed on a display 28 (FIG. 2) of the requesting vehicle with color coding to indicate a likelihood of availability. For example, green indicates that availability is likely (for example, more than 70% likely), yellow indicates that availability is possible (for example, more than 30% likely), and red indicates that availability is unlikely (for example, less than 30% likely). The requesting vehicle can then select an area corresponding to one of the received predicted curb availabilities in step S220. The predicted curb availability can be selected based on the largest predicted curb availability within a predetermined distance of the destination of the host vehicle. In step S230, the navigation system 30 generates a travel route to the curb 44 of the road segment 48, or the area, associated with the selected predicted curb availability.

Using a history of transmitted curb management information from a plurality of vehicles 10 and 14, the availability of a curb on a road segment can be predicted or forecast. Statistics for the usage of a curb of a road segment can be made. The statistics can be based on the occupancy and availability of the curb of the road segment, and patterns of activity, occupancy and availability, can then be determined therefrom. The pattern of activity can be based on a time of day, such as a specific hour or a time period, such as morning, noon, afternoon, night or midnight. The pattern of activity can be based on a particular day of the week, such as a weekday or the weekend. The pattern of activity can be based on a particular date or a season, such as summer. A pattern of activity for a curb of a road segment is determined based on the request received from the requesting vehicle, and the predicted curb availability is transmitted to the requesting vehicle.

Figure 13:
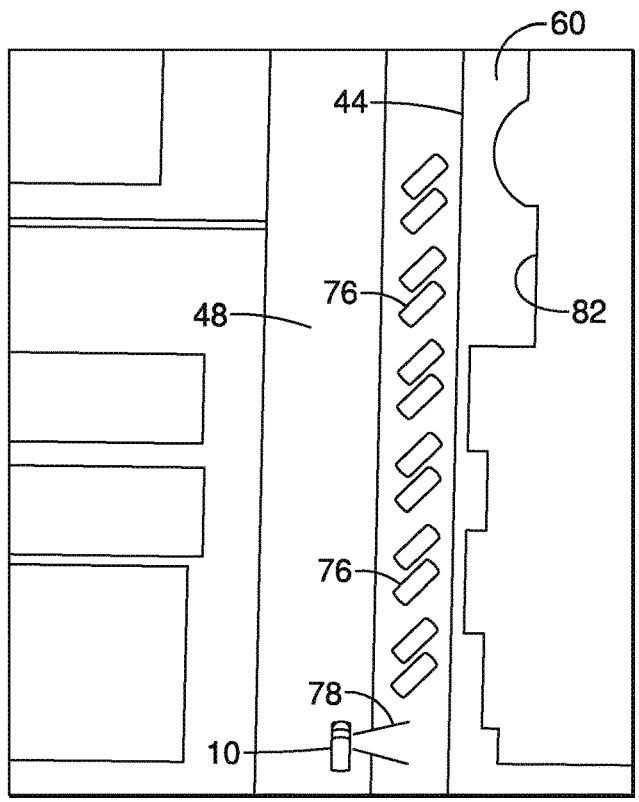
FIG. 13 is an illustration of the host vehicle of FIG. 1 in which curb availability data is activated.
Figure 14:
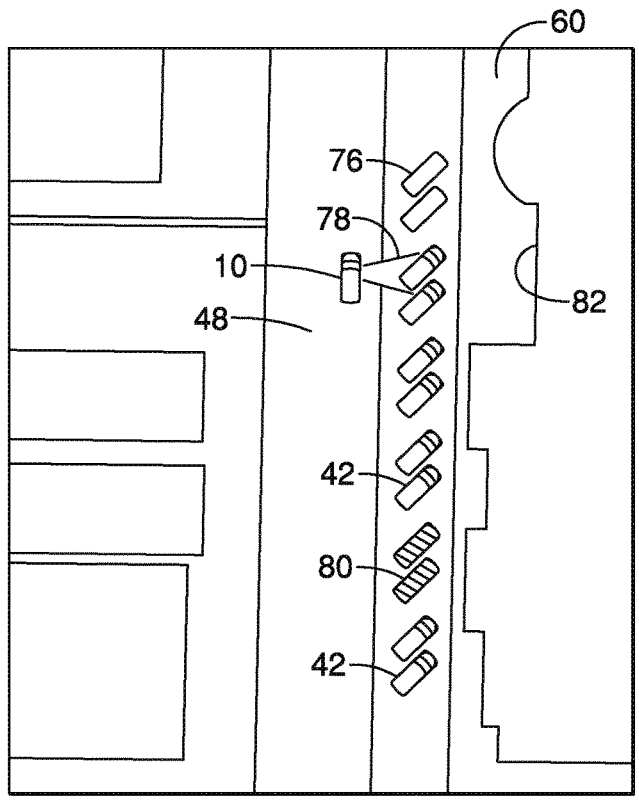
FIG. 14 is an illustration of the host vehicle of FIG. 13 obtaining curb information in which vehicles are parked at an angle relative to a curb.

FIGS. 13 and 14 illustrate the host vehicle 10 traveling the road 48 while the sensor 24 and the curb availability data collection is activated. As shown in FIG. 13, the vehicle 10 is traveling on the road 48 in which vehicles park in parking spots 76 that are at an angle relative to the curb 44. The parking spots 76 are adjacent to a storefront 82 in which a sidewalk 60 is disposed between the parking sports 76 and the storefront 82. The sensor 24 has a coverage area 78 when the curb availability data collection is activated. As shown in FIG. 13, the vehicle 10 has not traveled the road 48 such that whether the parking spots 76 along the curb 44 are available or occupied has not yet been determined by the curb management system 12 of the vehicle 10.

As the vehicle 10 travels the road segment 48, the curb availability data is collected in accordance with the process illustrated in the flowchart of FIG. 10. The curb management system 12 of the vehicle 10 generates a visible ground polygon 46 (FIG. 7), projects the visible ground polygon to a global reference frame, and transmits the processed curb management information to the server 20. As shown in FIG.

14, the curb management system of the server 20 determines whether each parking spot 76 is occupied by a parked vehicle 42 or is available 80 based on the merged and normalized records received from transmitting vehicles and used to update the map data in accordance with the process illustrated in the flowchart of FIG. 11. As shown in FIG. 14, parked vehicles 42 indicate a parking spot 76 that is occupied and cross-hatching 80 indicates a parking spot 76 that is not occupied, or available. Timestamping the normalized curb availability data allows the server 20 to determine a pattern of activity and to predict curb availability based on a factor, such as a time of day or a day of the week, selected by the requesting vehicle.

Figure 15:
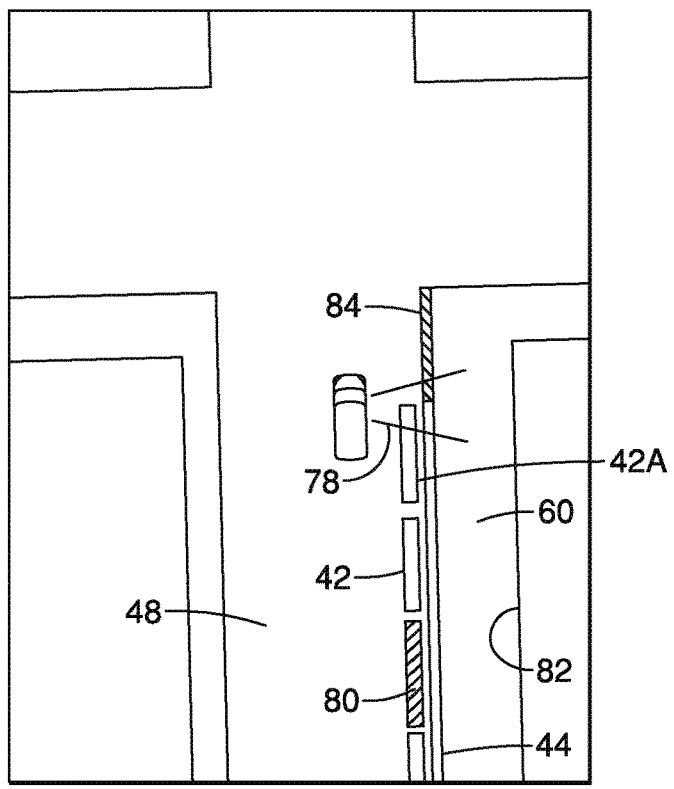
FIG. 15 is an illustration of the host vehicle of FIG. 1 obtaining curb information in which vehicles are parked perpendicularly relative to a curb.
Figure 16:
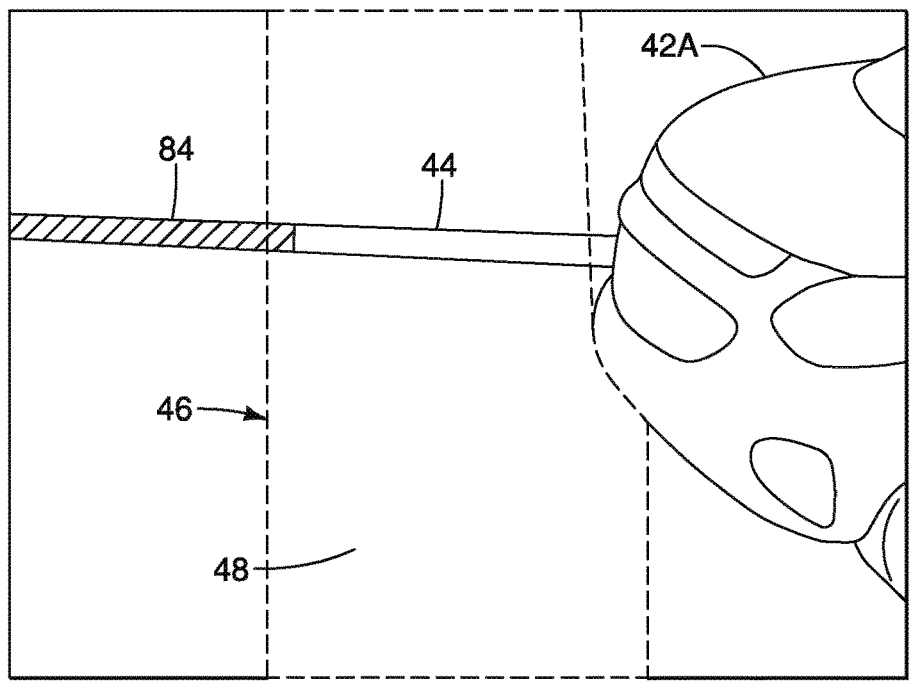
FIG. 16 is an illustration of an image captured by the host vehicle of FIG. 15.

FIGS. 15 and 16 illustrate the host vehicle 10 traveling the road segment 48 with the curb availability data collection activated. As shown in FIG. 14, the transmitting vehicle 10 is traveling on the road segment 48 in which vehicles park parallel to the curb 44. The curb 44 is adjacent to a storefront 82 and the sidewalk 60 is disposed between the curb 44 and the storefront 82. Portions 84 of the curb 44 are unavailable for parking, such as a no parking zone, and is indicated on the map data stored in the database 72 (FIG. 3).

The sensor 24 has a coverage area 78 when the curb availability data collection is activated. In FIG. 15, the vehicle 10 has traveled the road 48 and transmitted the processed curb management information to the server 22 based on each of the captured images captured by the sensor 24 (FIG. 2). The server updates the map data with the curb management information corresponding to the road segment 48 illustrated in FIG. 15. The updates map data indicates whether the ground adjacent the curb 44 is occupied or vacant. The parked vehicle 42 indicates occupied curb space. Cross-hatching 80 indicates curb space that is available. The cross-hatched portion of the curb 44 indicates a no-parking zone 84.

A view of the sensor 24 is illustrated in FIG. 16. The illustrated view corresponds to the position of the vehicle 10 and to the coverage area 78 of the sensor 24 shown in FIG. 15. The dashed lines indicate the visible ground polygon 46 generated by the process of the flowchart of FIG. 10. The parked car 42A in FIG. 15 forms a portion of the boundary of the visible ground polygon 46. The visible ground polygon 46 excludes space/area occupied by an obstacle, such that the space occupied by the car 42A in FIG. 15 is excluded from the visible ground polygon 46 illustrated in FIG. 16. As shown in FIG. 15, the map data is updated by the server 20 based on the curb management information transmitted by the transmitting vehicle 10 and indicates that the space adjacent to the curb 44 corresponding to the parked vehicle 42A is occupied.

Figure 17:
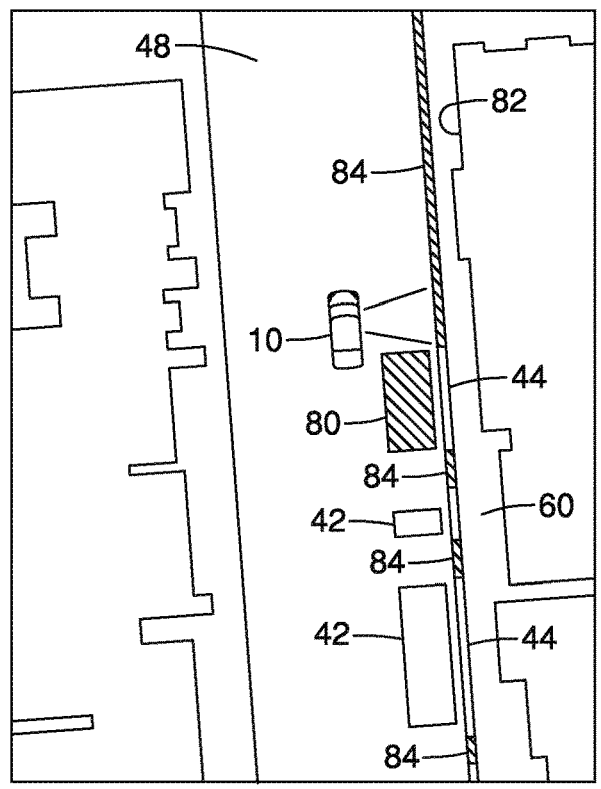
FIG. 17 is an illustration of the host vehicle of FIG. 1 obtaining curb information in which vehicles are parked parallel relative to a curb.
Figure 18:
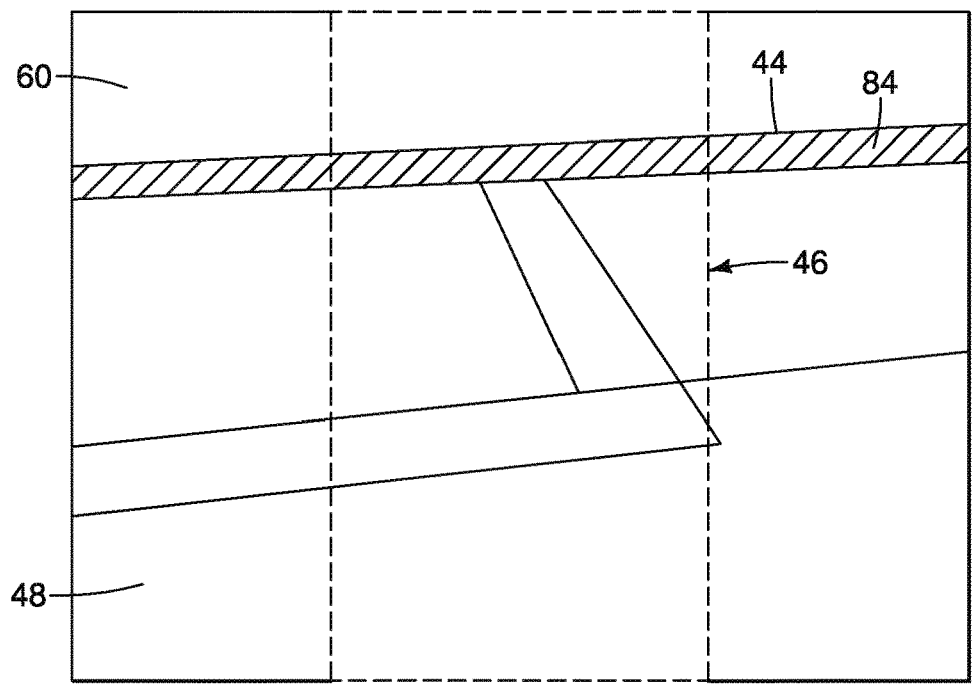
FIG. 18 is an illustration of an image captured by the host vehicle of FIG. 17.

FIGS. 17 and 18 illustrate the host vehicle 10 traveling the road segment 48 while the curb availability data collection is activated. As shown in FIG. 17, the transmitting vehicle 10 is traveling on the road segment 48 in which vehicles park perpendicular to the curb 44. The curb 44 is adjacent to a storefront 82 and the sidewalk 60 is disposed between the curb 44 and the storefront 82. Portions 84 of the curb 44 are unavailable for parking, such as a no parking zone, and is indicated on the map data stored in the database 72 (FIG. 3).

The sensor 24 has a coverage area 78 when the curb availability data collection is activated. In FIG. 17, the vehicle 10 has traveled the road segment 48 and transmitted the processed curb management information to the server 20. The server updates the map data with the information shown in FIG. 17 obtained by the vehicle 10. The curb management information transmitted by the vehicle 10 indicates whether the ground adjacent the curb 44 is occupied or vacant. The parked vehicle 42 indicates occupied curb space. Cross-hatching 80 indicates curb space that is available. The cross-hatched portion of the curb 44 indicates a no-parking zone 84.

A view of the sensor 24 is illustrated in FIG. 18. The illustrated view corresponds to the position of the vehicle 10 and to the coverage area 78 of the sensor 24 shown in FIG. 17. The dashed lines indicate the visible ground polygon 46 generated by the process of the flowchart of FIG. 10. The visible ground polygon 46 illustrated in FIG. 18 is a rectangle because no objects are detected to be excluded from the visible ground polygon. In other words, the entire area of the visible ground polygon 46 corresponds to visible ground surface. As shown in FIG. 17, the map data is updated by the server 20 based on the curb management information transmitted by the transmitting vehicle 10 and indicates that the space adjacent to the curb 44 corresponding to the parked vehicle 42 is occupied and that the space 80 not occupied by a parked vehicle is available. The map data excludes the no-parking zone 84 from the available parking area along the curb 44.

Based on the map data updated by the server 20 based on the curb management information transmitted by the vehicles 10 and 14, such as the curb management information corresponding to the road segments illustrated in FIGS. 9, 14, 15 and 17, the server 20 can predict curb availability and transmit the predicted curb availability to the requesting vehicle 10 and 14. This information can also be used to monitor curb use for informational purposes, as well as to enforce dynamic curb allocation. The dynamic curb allocation can designate curb space as parking for a specified period, as loading/unloading for a specified period, and/or pick-up/drop-off for a specified time. The allocation can be based on the processed and transmitted curb management information transmitted by the transmitting vehicles 10 and 12 to the server 20, which the server uses to update the map data, in accordance with exemplary embodiments of the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the system and method of curb management. Accordingly, these terms, as utilized to describe the present invention should be interpreted relative to a vehicle equipped with the system and method of curb management.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A curb management system for a host vehicle comprising:
    a sensor configured to detect information relating to a presence of a parked vehicle along a curb of a road;
    an electronic controller configured to determine curb management information based on the information detected by the sensor, the electronic controller being configured to determine the curb management information by generating a visible ground polygon extending from the curb to the vehicle based on the information detected by the sensor, the generated visible ground polygon indicting space along the curb of the road not occupied by an object, a cutout portion in the generated visible ground polygon indicating an object; and
    a wireless communication system configured to transmit the curb management information to a remote server and to receive a predicted curb availability from the remote server.

2. The curb management system according to claim 1, wherein
    the sensor is activated to detect the information upon a navigation system of the host vehicle determining that the host vehicle is entering a predetermined geographical location.

3. The curb management system according to claim 1, wherein
    the sensor is activated to detect the information upon a speed of the host vehicle being less than a predetermined speed.

4. The curb management system according to claim 1, wherein
    the sensor is activated to detect the information upon a navigation system of the host vehicle determining that the host vehicle is in a right-most lane of a road being traveled.

5. The curb management system according to claim 1, wherein
    the sensor is activated to detect the information upon a navigation system of the host vehicle determining that the host vehicle is traveling on a selected road type selected in the navigation system.

6. The curb management system according to claim 1, wherein
    the sensor is activated to detect the information based on a time of day.

7. The curb management system according to claim 1, wherein
    a navigation system of the host vehicle routes the host vehicle to an area having a largest predicted curb availability within a predetermined distance of a destination of the host vehicle.

8. A method of managing curb availability comprising:
    detecting information relating to a presence of a parked vehicle along a curb of a road with a sensor of a vehicle;
    determining curb management information based on the information detected by the sensor with a controller of the vehicle, the electronic controller being configured to determine the curb management information by generating a visible ground polygon extending from the curb to the vehicle based on the information detected by the sensor, the generated visible ground polygon indicting space along the curb of the road not occupied by an object, a cut-out portion in the generated visible ground polygon indicating an object;
    transmitting the curb management information to a remote server;
    updating map data based on the curb management information;
    predicting a curb availability based on the updated map data; and
    transmitting the predicted curb availability to a requesting vehicle.

9. The method of managing curb availability according to claim 8, wherein
    the remote server receives the curb management information from a plurality of vehicles.

10. The method of managing curb availability according to claim 8, wherein
    the remote server transmits a plurality of predicted curb availabilities to the requesting vehicle.

11. The method of managing curb availability according to claim 10, wherein
    the plurality of predicted curb availabilities are for curbs within a predetermined distance of a destination of the requesting vehicle.

12. The method of managing curb availability according to claim 11, wherein
    the plurality of predicted curb availabilities are displayed on a display of the requesting vehicle.

13. The method of managing curb availability according to claim 12, further comprising
    selecting one of the plurality of predicted curb availabilities displayed on the display of the requesting vehicle; and
    generating a travel route to the curb associated with the selected predicted curb availability.

14. The method of managing curb availability according to claim 8, wherein
   the transmitted predicted curb availability is color-coded to indicate a likelihood of availability.

15. The method of managing curb availability according to claim 8, wherein
   the predicting curb availability includes determining a pattern of activity associated with a curb.

16. The method of managing curb availability according to claim 15, wherein
   the pattern of activity is based on a time of day.

17. The method of managing curb availability according to claim 15, wherein
   the pattern of activity is based on a day of the week.

18. The method of managing curb availability according to claim 8, wherein
   activating the sensor to detect the information relating to the presence of the parked vehicle along the curb of a road.

19. The method of managing curb availability according to claim 18, wherein
   the sensor is activated to detect the information upon a navigation system of the vehicle determining that the vehicle is entering a predetermined geographical location.

20. The method of managing curb availability according to claim 19, further comprising
   stopping the sensor upon the navigation system of the vehicle determining that the vehicle is exiting the predetermined geographical location.

* * * * *